(12) United States Patent
Kim

(10) Patent No.: US 11,169,485 B2
(45) Date of Patent: Nov. 9, 2021

(54) HOLOGRAM DISPLAYING APPARATUS AND METHOD THEREOF

(71) Applicant: ELECTRONICS AND TELECOMMUNICATIONS RESEARCH INSTITUTE, Daejeon (KR)

(72) Inventor: Hyun Eui Kim, Cheongju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 383 days.

(21) Appl. No.: 16/236,141

(22) Filed: Dec. 28, 2018

(65) Prior Publication Data

US 2019/0204783 A1    Jul. 4, 2019

(30) Foreign Application Priority Data

Dec. 28, 2017    (KR) .......................... 10-2017-0182935
Dec. 28, 2018    (KR) .......................... 10-2018-0172289

(51) Int. Cl.
*G03H 1/22* (2006.01)
*G02B 5/32* (2006.01)
*G03H 1/02* (2006.01)

(52) U.S. Cl.
CPC ............. *G03H 1/2294* (2013.01); *G02B 5/32* (2013.01); *G03H 1/0248* (2013.01); *G03H 1/2205* (2013.01); *G03H 2001/221* (2013.01); *G03H 2001/2207* (2013.01); *G03H 2210/30* (2013.01);

(Continued)

(58) Field of Classification Search
CPC .. G03H 1/2294; G03H 1/2205; G03H 1/0248; G03H 2223/12; G03H 2223/23; G03H 2223/19; G03H 2001/221; G03H 2001/2207; G03H 2210/30; G03H 1/32; G03H 2001/0224; G02B 5/32; G02B 30/00

See application file for complete search history.

(56) References Cited

U.S. PATENT DOCUMENTS

2014/0333977 A1    11/2014    Hwang et al.
2014/0340724 A1*   11/2014    Won .................... G02B 30/27
                                                                359/20

(Continued)

FOREIGN PATENT DOCUMENTS

KR              101639671           7/2016

OTHER PUBLICATIONS

Kim, et al., "Noise-Filtering Method for Large-Scale Holographic 3D Display," IEEE, 2018, pp. 36-40.

(Continued)

*Primary Examiner* — Kimberly N. Kakalec

(57) ABSTRACT

In the present invention, by providing a hologram displaying apparatus including a light source configured to emit input light, a spatial light modulator configured to modulate the input light into diffracted light, and a plurality of noise filtering elements configured to remove optical noise components from the diffracted light modulated by the spatial light modulator, and display a hologram, an optical path of a light source for displaying the hologram can be drastically reduced while effectively performing spatial filtering.

20 Claims, 6 Drawing Sheets

(52) U.S. Cl.
CPC ..... *G03H 2223/12* (2013.01); *G03H 2223/19* (2013.01); *G03H 2223/23* (2013.01)

(56) References Cited

U.S. PATENT DOCUMENTS

| | | | |
|---|---|---|---|
| 2015/0085331 A1* | 3/2015 | Chae | G03H 1/2294 359/9 |
| 2015/0185699 A1* | 7/2015 | Yamamoto | G03H 1/2294 359/9 |
| 2016/0216691 A1* | 7/2016 | Kim | G02B 26/0891 |
| 2017/0060088 A1 | 3/2017 | Kim et al. | |
| 2017/0123204 A1* | 5/2017 | Sung | G02B 27/0103 |
| 2018/0129166 A1* | 5/2018 | Seo | G03H 1/2205 |

OTHER PUBLICATIONS

Kurihara, et al., "Improving Viewing Region of 4f Optical System for Holographic Displays," Opt Express, 2011, vol. 19 (18), pp. 17621-17631.

\* cited by examiner

HOLOGRAM DISPLAYING APPARATUS AND METHOD THEREOF

CROSS-REFERENCE TO RELATED APPLICATION

This application claims priority to and the benefit of Korean Patent Application No. 10-2017-0182935 filed in the Korean Intellectual Property Office on Dec. 28, 2017, and Korean Patent Application No. 10-2018-0172289 filed in the Korean Intellectual Property Office on Dec. 28, 2018, the entire contents of which are incorporated herein by reference.

BACKGROUND OF THE INVENTION

(a) Field of the Invention

The present invention relates to a hologram displaying method and apparatus that includes a spatial light modulator with a large area.

(b) Description of the Related Art

Recently, three-dimensional (3D) images have been utilized in various industries due to the development of 3D display technology. Particularly, research on holograms that display objects as in real life are being actively conducted, and contents using holograms are being produced in various fields such as broadcasting, displaying, and performance.

The holography technique is a technique to simultaneously record or display the amplitude information and phase information of light using a laser, which is a coherent light source, by using the coherent phenomenon of light.

Digital holography, based on these technical features, can be applied in various fields such as through holographic display technology for dynamically reproducing three-dimensional images, holographic printing technology, holographic memory technology for data storage, holographic measurement technology related to holographic microscopy to acquire three-dimensional information, and so on.

The present invention was supported by 'The Cross-Ministry Giga KOREA Project' grant funded by the Korea government (MSIT) (GK17D0100, Development of Telecommunications Terminal with Digital Holographic Tabletop Display).

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides an optical noise filtering system for reducing an optical path of a large area holographic displaying apparatus.

A hologram displaying apparatus includes: a light source configured to emit input light; a spatial light modulator configured to modulate the input light into diffracted light; and a plurality of noise filtering elements configured to remove optical noise components from the diffracted light modulated by the spatial light modulator, and display a hologram.

Each of the plurality of noise filtering elements includes: a first lens in contact with a pixel block including some pixels of a plurality of pixels of the spatial light modulator, and focusing the light diffracted by the pixel block; a second lens transmitting remaining diffracted light of the focus diffracted light except the optical noise component; a spatial filter disposed in parallel with the second lens corresponding to the spatial light modulator, and removing the optical noise component; and a plurality of third lenses disposed in parallel corresponding to the spatial filter, and displaying the hologram using the diffracted light in which the noise components are removed from the diffracted light.

The first lens, the second lens, and each of the plurality of third lenses include a diffractive optical element or a refractive optical element.

The first lens includes a first hologram optical element, and blocks a part of waves of the light diffracted by the pixel block in a specific direction.

The second lens includes a second hologram optical element, and blocks a part of waves of the light diffracted by the pixel block in a specific direction.

The first hologram optical element is configured to block higher-order diffraction components beyond the second order diffraction component diffracted in a first direction of the light diffracted by the pixel block, and the second hologram optical element is configured to block higher order diffraction components beyond the second order diffraction component focused in a second direction of the focused diffracted light.

The first hologram optical element and the second hologram optical element are composed of a volume diffractive optical element.

The first lens and the third lens have a first length, and a sum of a size of the second lens and a size of the spatial filter is equal to the first length.

The width of the light diffracted from each pixel block is twice the second length.

The apparatus further includes an upper partition wall for blocking light diffracted from each pixel block into an upper region of the second lens, and a lower partition wall for blocking light diffracted from each of the pixel blocks into a lower region of the spatial filter.

The spatial filter is a single sideband filter for blocking a direct current component of the focused diffracted light and a conjugated component of the diffracted light from which the DC component is removed from the focused diffracted light.

A hologram displaying apparatus includes a spatial light modulator, a first lens module, a second lens module, and a third lens module, wherein the first lens module to the third lens module are convex lens modules, the first lens module is located in contact with an input image plane of the spatial light modulator and applies focusing power on the light wave modulated in the spatial light modulator to prevent the modulated light wave from diverging, the second lens module is located on a rear focal plane of the first lens module and projects the light wave to an area where the third lens module is located, the third lens module converges the light wave that passes through the second lens module to display the input image plane in a space adjacent to the third lens module, and a focal power of the second lens module is the same as a sum of a focal power of the first lens module and a focal power of the third lens module.

The first lens module is placed in contact with the spatial light modulator, and further includes a spatial filter disposed in parallel with the second lens module, and spatially blocks optical noise including a DC component, a conjugate component, or a high-order component of the modulated light wave, a sum of a size of the second lens module and a size of the spatial filter is the same as a size of the first lens module, and the third lens module converges a signal of the modulated light wave where the optical noise is removed.

The entire region of the spatial light modulator includes a plurality of pixel blocks including a plurality of pixels, the first lens module is disposed in parallel corresponding to each of the pixel blocks and includes a plurality of first lenses for applying focusing power to the light waves modulated in each of the pixel blocks, the second lens module is disposed in parallel corresponding to each of the pixel blocks and includes a plurality of second lenses for projecting the light waves modulated in each of the pixel blocks to an area where the third lens module is located, and the third lens module is disposed in parallel corresponding to each of the pixel blocks and includes a plurality of third lenses for converging the light waves transmitted by each of the second lenses.

The size of each of the first lenses, the size of each of the second lenses, and the size of each of the third lenses is equal to the size of each of the pixel blocks, and the focal length of each of the first lenses is equal to the focal length of each of the third lenses.

Each of the first lenses consists of a DOE (diffractive optical element) including a holographic optical element (HOE), and each of the first lenses includes the DOE or HOE of a volume-type diffractive optical element structure and reduces intensity of light waves of a higher-order term propagated to a region where other adjacent pixel blocks and other first lenses corresponding to the other adjacent pixel block are located.

Each of the second lenses includes a DOE (diffractive optical element) including a holographic optical element (HOE), and blocks a direct current (DC) component, a phase-conjugate component of a predetermined hologram signal, and a high-order component among the modulated light waves using an angular selective characteristic of the HOE.

The apparatus further includes a plurality of partition walls for blocking propagation of the modulated light waves in one pixel block of the spatial light modulator to an area where other adjacent pixel blocks and a first lens to a third lens corresponding to the other adjacent pixel blocks is located.

The spatial filter includes a single sideband filter, and the single sideband filter removes optical noise by phase-shifting for the light waves modulated by the spatial light modulator.

A hologram displaying apparatus includes: a light source configured to emit light; a spatial light modulator including a plurality of pixels configured to diffract the emitted light; a first lens in contact with a pixel block including some pixels of a plurality of pixels of the spatial light modulator and configured to focus the light diffracted by the pixel block; a second lens configured to transmit remaining diffracted light of the focused diffracted light except a noise component; a spatial filter disposed in parallel with the second lens and configured to block the noise component of the focused diffracted light; and a third lens configured to display a hologram by focusing light waves of which the noise component is removed.

DETAILED DESCRIPTION OF THE EMBODIMENTS

Figure 1:
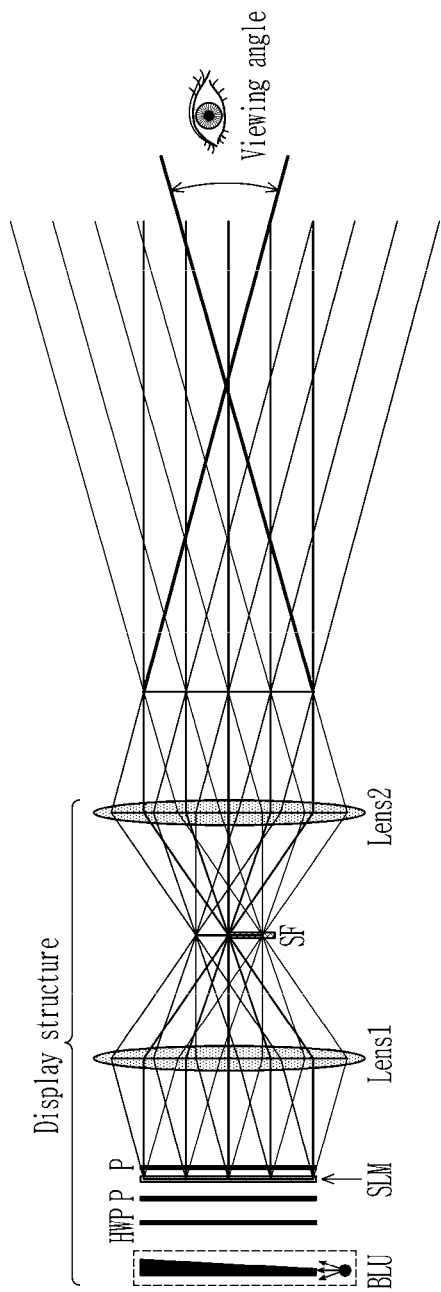
FIG. 1 shows a large area hologram displaying apparatus according to the conventional art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a large area hologram displaying apparatus according to the conventional art.

According to the conventional art, by illuminating the reference light for hologram image reproduction, on a transmission-type SLM (spatial light modulator) using a BLU (Backlight Unit) located at the front of the SLM, the optical signal is emitted in the rear direction of the SLM.

The optical signal (RI) emitted from the SLM can be expressed using Equation 1 below.

$$RI = R|R|^2 + R|O|^2 + |R|^2 O + R^2 O^*$$

In the above, R is a reference light, I is a hologram pattern, and O is an object wave.

In Equation 1, the first term and the second term are 0th-order diffracted light of a direct current (DC) component, and are defined as noise.

Since the third term is formed as a virtual image, it can be defined as noise in a hologram displaying apparatus.

The fourth term is the conjugate wave of the third term (object light). The fourth term is formed as a real image in the form of a pseudoscopic image in which parallax is reversed with respect to the third term of the virtual image. Actually, the fourth term is formed as a twin shape of the third term which is a virtual image. The fourth term is the signal to be displayed.

Therefore, the first, second, and third terms of the optical signal (RI) must be blocked in space.

According to the conventional art, in order to remove the aforementioned noise in the hologram displaying apparatus such as the first term, the second term, and the third term, as shown in FIG. 1, a filtering method using single-sideband modulation can be used by disposing a spatial filter (SF) on the focal plane of the Lens1.

In order to use the filtering method described above, by locating a 4f optical system as shown in FIG. 1, locating a spatial filter (SF) on the rear focal plane of the first lens (Lens1), that is, the Fourier plane, by filtering the conjugate component (third term) and the DC component (first term, second term) of the object wave in the optical signal (RI) by Fourier transform for the hologram, it is possible to obtain only an effective component signal (single sideband signal) where the noise components are removed. The second lens (Lens2) included in the 4f optical system displays the Fourier transformed effective component in space.

On the other hand, the size and viewing angle of the displayed hologram are determined by the area of the SLM of the hologram displaying apparatus and the pixel pitch. Therefore, it is important to widen the display area of the SLM of the hologram displaying apparatus, and narrow the pixel pitch, so as to enlarge the hologram size and viewing angle.

However, there are a number of problems in configuring a noise filtering system using a 4f optical system with large diffraction angles and large area SLMs. One of the problems is that, as the angle of the SLM area and diffraction light increases, the diameter of the lens converging the diffracted light modulated by the SLM must be larger and the numerical aperture (NA) should be higher. A lens with a large diameter and a higher numerical aperture has a significantly high manufacturing cost and a considerable weight.

Also, as the aperture of the lens becomes larger and the curvature becomes smaller, an optical aberration becomes larger. When the optical aberration become larger, the diffracted light modulated by the SLM cannot be accurately transmitted to the space intended by the manufacturer. In this case, the displayed hologram image is distorted and the image quality of the hologram image is deteriorated. In order to avoid such performance deterioration, there is a method of manufacturing a lens having a longer focal length. However, in the 4f optical system, the optical path through which diffracted light propagates becomes very long, and a lens of a larger diameter than that of the conventional lens is required. As a result, the entire volume of the hologram displaying apparatus becomes considerably larger.

In order to solve the above problem, a new holographic display optical system suitable for SLM is required.

Hereinafter, referring FIG. 2 to FIG. 6, a hologram displaying apparatus according to an exemplary embodiment of the present invention capable of solving the above problems will be described.

Hereinafter, referring FIG. 2 to FIG. 6, all of the lenses (or DOEs) described are assumed to be convex lenses, but need not necessarily be limited thereto.

Figure 2:
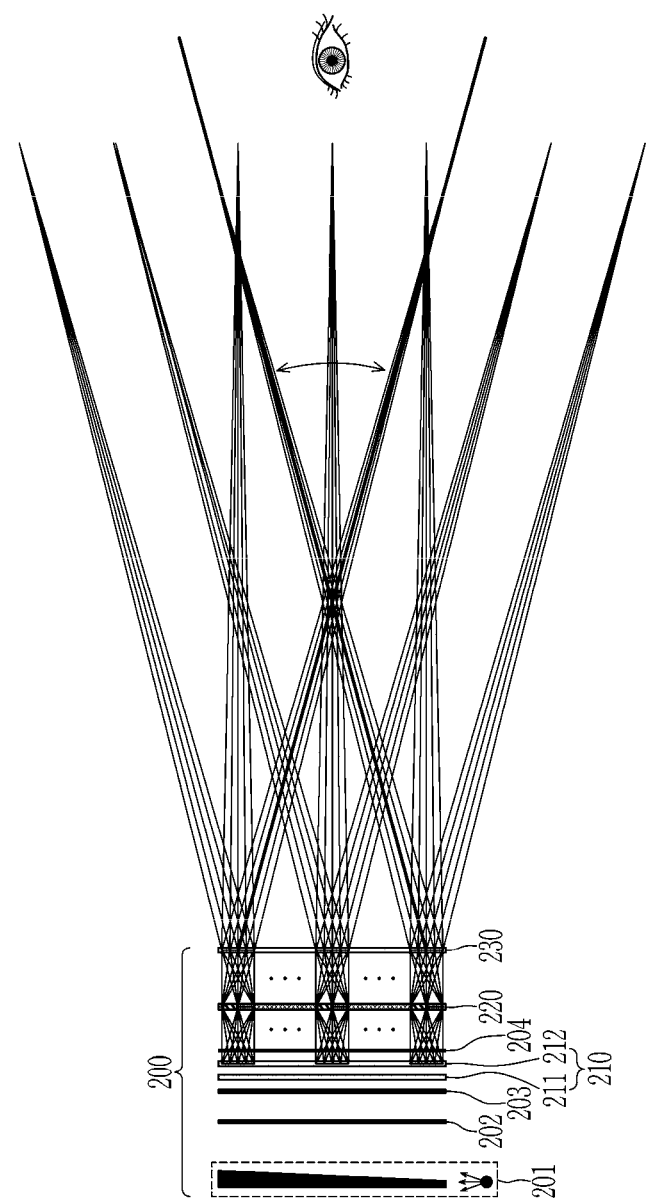
FIG. 2 shows a hologram displaying apparatus according to an exemplary embodiment of the present invention.

FIG. 2 shows the hologram displaying apparatus according to an exemplary embodiment of the present invention.

As shown in FIG. 2, the hologram displaying apparatus 200 according to an exemplary embodiment of the present invention includes a light source 201, a front lens module 210, a plurality of filter modules 220 including lenses, and a back lens module 230. The hologram displaying apparatus 200 displays a hologram in a space.

The light source 201 emits coherent input light. The light source 201 emits collimated interference light in a direction in which the front lens module 210 is located. The light source includes a backlight unit (BLU). For example, the input light is the reference light described above referring to FIG. 1.

A half-wavelength plate (HWP) 202 rotates the polarization direction of input light emitted from the light source 201.

The first polarizing film 203 and the second polarizing film 204 are located before and after the front lens module 210. The first polarizing film 203 and the second polarizing film 204 transmit polarized light (linearly polarized light or circularly polarized light) that is polarized in a specific direction.

The front lens module 210 includes a spatial light modulator 211 and a plurality of front lenses 212 arranged to contact to the spatial light modulator.

The spatial light modulator 211 modulates the input light, and the input light is diverged. The spatial light modulator 211 may be a transmissive spatial light modulator. When the spatial light modulator 211 is a reflective spatial light modulator, the front lens module 210 further includes a beam splitter (BS) that distributes a plurality of light beams modulated by the spatial light modulator 211.

A plurality of pixels of the spatial light modulator 211 may be divided into groups of pixel blocks by a plurality of pixel periods.

Each front lens of the plurality of front lenses 212 corresponds to a pixel block. The plurality of front lenses 212 are disposed in parallel corresponding to each of the pixel blocks. The plurality of front lenses 212 are arranged to contact the image plane of the spatial light modulator 211. Each front lens is a lens of the same size as each pixel block. Each front lens is a diffractive element (DOE, diffractive optical element) or a refractive optical element, and functions as a lens. In the following description, it is assumed that each front lens is a DOE in an exemplary embodiment of the present invention, wherein the front lens is called a first DOE. The plurality of first DOEs (same as plurality of first lenses 212) have the same focal length and the same diameter. Each first DOE focuses the modulated diffracted light at individual pixels of each pixel block onto the back focal plane of each first DOE. That is, each first DOE imparts focusing power to the diffracted light emitted from the individual pixels of each pixel block, thereby focusing the diffracted light so as not to diverge. Each first DOE performs Fourier transform to the modulated diffracted light in each pixel block and transmits it to the back focal plane of the first DOE.

Each filter module of the plurality of filter modules 220 corresponds to each pixel block. In the plurality of filter modules 220, each filter module is disposed in parallel corresponding to each pixel block and disposed on the back focal plane of the first DOE. Each filter module has the same size as the size of each filter module. Each filter module includes a spatial filter (SF) for blocking the DC component and the conjugate component of the diffracted light modulated by the spatial light modulator 211, and a lens (second DOE) having a second focal length, which is half of the first focal length (focal length of the first DOE), and passing through the effective light excluding the DC component and the conjugate component in the diffracted light (noise filtered diffracted light). Each second DOE performs a lens function, which can be selectively configured of DOE or refractive optical elements. The size of each spatial filter may be larger than the size of each second DOE. The sum of the size of each spatial filter and the size of the second DOE is equal to the size of each pixel block.

Each modulated diffracted light from each pixel block of the spatial light modulator 211 is focused on the back focal plane of the first DOE, and each second DOE disposed on the back focal plane of the first DOE transmits the effective light, which is a single sideband signal among the diffracted lights focused on the back focal plane of the first DOE (noise-canceled diffracted light), to the back lens module 230 disposed on the back focal plane of the second DOE disposed at the back by the first focal length from the back focal plane of the first DOE.

The back lens module 230 includes a plurality of third DOEs of the same size as each first DOE of the front lens module 210. Each third DOE performs a lens function, and can be selectively configured of DOE or refractive optical elements. Each third DOE has the same size and the same focal length as the first DOE. Each of a plurality of third DOEs is disposed in parallel at a position spaced from the second DOE by the focal length of the third DOE. Each third DOE, which is disposed on the back focal plane of the second DOE, transmits a hologram to the back of the back lens module 230 using the effective light (noise-canceled diffracted light) transmitted from each of the plurality of filter modules 220. The plurality of third DOEs of the back lens module 230 transmit a part of the entire area of the hologram corresponding to each third DOE.

Accordingly, when the focal length of each lens (Lens 1, Lens 2 in FIG. 1) of the hologram displaying apparatus according to the conventional art is f, the light path from the spatial light modulator to the hologram image is 4*f. However, the optical path of the hologram displaying apparatus according to the present invention is f+f=2f. In other words, the optical path of the hologram displaying apparatus according to the present invention is half of that of the conventional art.

Such an optical path is the result of the case of the limited application of the proposed 2f-based transfer optics excluding parallel processing. However, the optical paths of an in parallel optical filtering method using plurality of noise filtering elements located in parallel according to an exemplary embodiment of the present invention becomes inversely proportional to the number of unit noise filtering elements.

Figure 3:
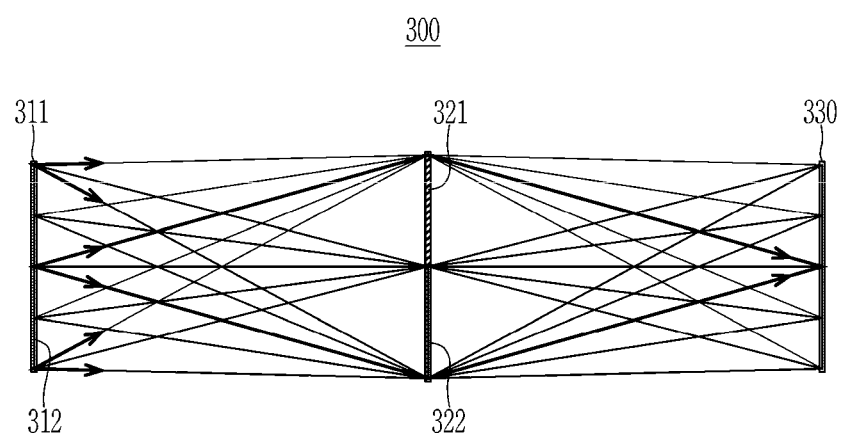
FIG. 3 shows each pixel block in a parallel noise filtering device and corresponding unit noise filtering elements according to an exemplary embodiment of the present invention.

FIG. 3 shows each pixel block in a parallel noise filtering device and corresponding unit noise filtering elements according to an exemplary embodiment of the present invention.

As shown in FIG. 3, according to an exemplary embodiment of the present invention, the unit noise filtering element 300 of the hologram displaying apparatus includes a pixel block 311.

The pixel block 311 modulates the input light transmitted from the light source (the light source 201 of FIG. 2).

The first DOE 312 is arranged to contact the pixel block 311. The first DOE 312 focuses the diffracted light modulated by the pixel block 311 from the first DOE 312 to the back focal plane of the first DOE, which is separated by the first focal distance (the focal distance of the first DOE) from the first DOE 312.

The size of each filter module 321 and 322 is equal to the size of each pixel block 311 and each first DOE 312. The spatial filter 322 is located in parellel with the second DOE 321, and blocks the DC component and conjugate component of the focused light focused by the first DOE 312. The second DOE 321 transmits the effective component (the noise-removed diffracted light) of the light focused by the first DOE 312, and transmits the effective component from the second DOE 321 to the third DOE 330, which is spaced by the first focal distance from the second DOE 321. At this time, the focal length of the second DOE 321 is half of the focal length of the first DOE 312.

The size of the third DOE 330 is equal to the size of each pixel block 311 and each first DOE 312. The optical performance (e.g., focal length) of the third DOE 330 is the same as the optical performance of the first DOE 312. The third DOE 330 transmits the effective component transmitted by the second DOE 321 to a location adjacent to the third DOE.

Figure 4:
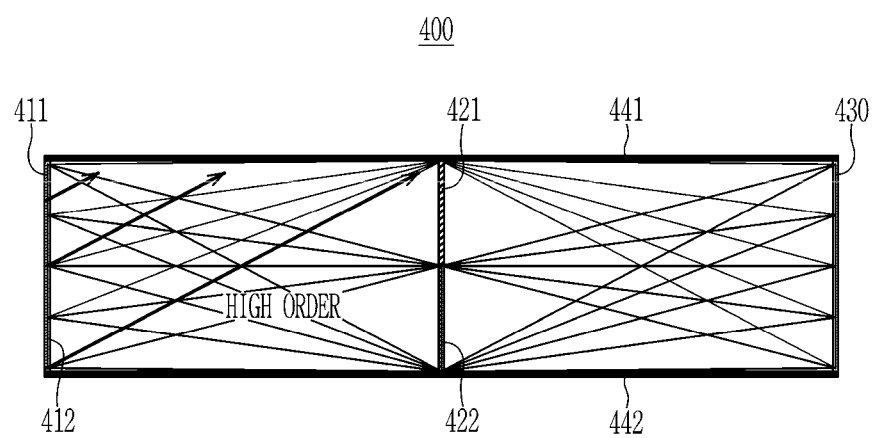
FIG. 4 shows a unit noise filtering element for removing high-order diffracted light according to an exemplary embodiment of the present invention.

Meanwhile, the higher order diffracted light of the modulated light in each pixel block 311 can be propagated to the outer space of the space where the filter modules 321 and 322 are located. Referring to FIG. 4, a method for eliminating the propagation of the higher order diffraction light to the adjacent filter module (not shown) will be described.

FIG. 4 shows a unit noise filtering element for removing high-order diffracted light according to an exemplary embodiment of the present invention.

One way to prevent high-order diffracted light from propagating to adjacent unit noise filtering elements (not shown) is to use a volume diffractive optical element structure as a second DOE 421 that reacts only for beams from a specific direction.

As an example of a DOE having a diffractive optical element structure that reacts only in a beam of a specific direction, the first DOE 412 can be composed of a holographic optical element (HOE). That is, in the first HOE (same as the first DOE 412), the energy of the high-order diffracted light modulated in the pixel block 411 is very low (has an energy value below a threshold value) and is not recognized.

Another example of a DOE having a volume-type diffractive optical element structure that reacts only in a specific direction beam is that a second DOE 421 is composed of a holographic optical element (HOE) to only transmit through diffracted lights modulated in a third direction except a second direction in which high-order diffracted light of modulated waves from the pixel block 411 corresponding to the second DOE 421 are focused. That is, the second HOE (same as the second DOE 421) can select only some of the light diffracted in the above-mentioned third direction based on the selectivity of the angle.

In both of the above examples, the first HOE (same as the first DOE 412) or second HOE (same as the second DOE 421) may be a transmissive HOE. If the first HOE (same as the first DOE 412) or second HOE (same as the second DOE 421) is a transmissive HOE, the angle range ($\Delta\theta$) selected by each HOE can be determined using Equation 2 below.

$$\Delta\theta = \frac{\lambda\sqrt{n^2 - \sin^2\theta_r}}{T\sin\theta_r\cos\theta_r} \qquad \text{[Equation 2]}$$

In Equation 2, n is the average refractive index of the hologram, $\lambda$ is the hologram recording wavelength, T is the thickness of the hologram, and $\theta_r$ is the angle between the object wave and the reference wave when writing the hologram to the spatial light modulator 211.

Another method for preventing high-order diffracted light from propagating to a unit noise filtering element (not shown) corresponding to another adjacent pixel block is to dispose partition walls 441 and 442 between each unit noise filtering element, and absorbing diffracted light using the partition walls.

That is, when the upper unit noise filtering element (not shown) is disposed at the top of the first unit noise filtering element 400 and the lower unit noise filtering element (not shown) is disposed at the bottom of the first unit noise filtering element 400 as shown in FIG. 4, the upper partition wall 441 and the lower partition wall 442 may prevent the light diffracted from the pixel block 411 of the first unit noise filtering element 400 from propagating to the upper unit noise filtering element or the lower unit noise filtering element.

For example, the light diffracted to the upper direction by the pixel block 411 of the first unit noise filtering element 400 shown in FIG. 4 cannot be transmitted to the upper unit noise filtering element (not shown) located at the upper end of the first unit noise filtering element 400 but is blocked by the upper partition wall 441 disposed at the upper end.

Also, for example, the diffracted light diffracted to the lower direction by the pixel block 411 of the first unit noise filtering element 400 shown in FIG. 4 cannot be transmitted to the lower unit noise filtering element (not shown) located at the lower end of the first unit noise filtering element 400 but is blocked by the lower partition wall 442 disposed at the lower end.

Through the above two methods, the effective light (diffracted light from which the noise component is removed) of the modulated diffracted light in each pixel block of each unit noise filtering element is transmitted only to each third DOE of each unit noise filtering element, and high-order waves of diffracted light modulated by each pixel block are not propagated to other unit noise filtering elements and are blocked in each unit noise filtering element.

In the above description, the partition walls positioned at the upper end and lower end of the first unit noise filtering element have been described. Alternatively, the left partition wall or the right partition wall blocking the diffracted light propagated to the other unit noise filtering device can be disposed.

Figure 5:
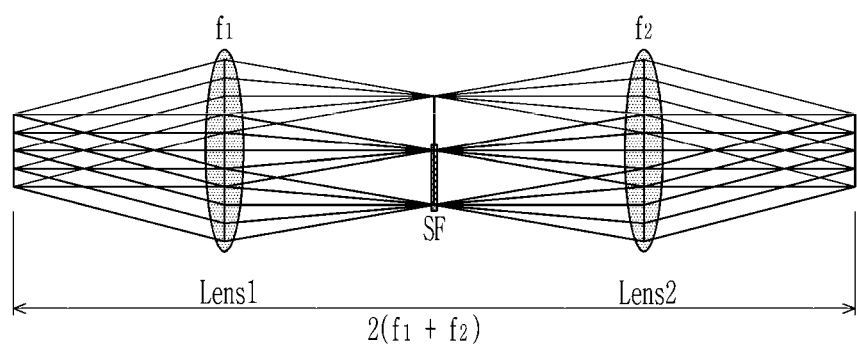
FIG. 5 shows an optical path of the noise filtering device of the hologram displaying apparatus according to the conventional art.
Figure 6:
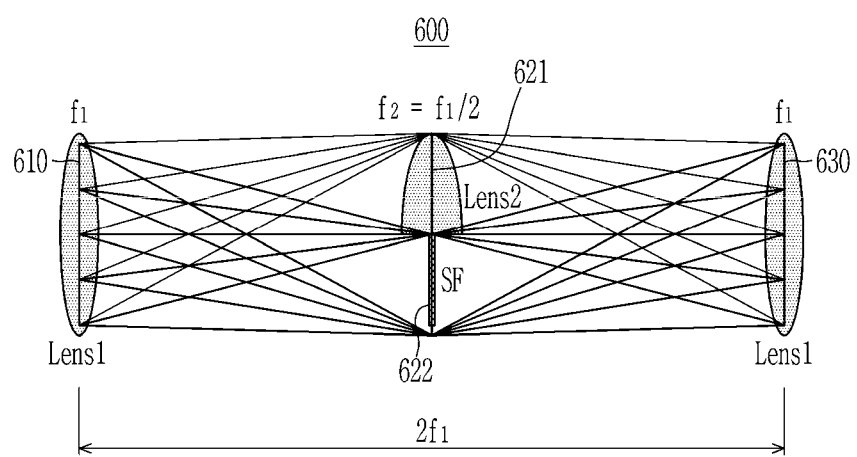
FIG. 6 shows an optical path of a parallel noise filtering device of a hologram displaying apparatus according to an exemplary embodiment of the present invention.

FIG. 5 shows an optical path of the noise filtering device of the hologram displaying apparatus according to the conventional art, and FIG. 6 shows an optical path of a parallel noise filtering device of a hologram displaying apparatus according to an exemplary embodiment of the present invention.

As shown in FIG. 5, the hologram displaying apparatus of a 4f optical system according to the conventional art includes Lens1 with a focal length f1 and Lens2 with a focal length f2. At this time, the optical path becomes 2*f1+2*f2=2*(f1+f2).

The hologram displaying apparatus 600 according to an exemplary embodiment of the present invention includes a front lens module 610 having a focal length f1, a back lens module 630 having a focal length f1, and filter modules 621 and 622 having a focal distance f1/2=f2. At this time, the optical path is 2*f1.

On the other hand, the diffraction width $Df_1$ of the diffracted light focused by the first DOE is determined based on the focal length f1 of the first DOE, the pixel pitch of the spatial light modulator 211, and the wavelength ($\lambda$) of the input light. That is, the diffraction width $Df_1$ of the diffracted light is determined by Equation 3 below.

$$Df_1 = f_1 * \lambda / pp \quad \text{[Equation 3]}$$

That is, as in Equation 3, the diffraction width $Df_1$ is obtained by dividing the product of the focal length f1 of the first DOE and the wavelength ($\lambda$) of the input light by the pixel pitch (pp) of the spatial light modulator 211. That is, the diffraction width $Df_1$ is proportional to the focal length f1 of the first DOE and the wavelength ($\lambda$) of the input light, and is inversely proportional to the pixel pitch (pp) of the spatial light modulator 211.

In order to prevent the modulated diffracted light in each pixel block from being transmitted to other adjacent unit noise filtering elements, the width $Df_1$ of the diffracted light as defined in Equation 3 and the size of the filter module (spatial filter 422 and second DOE 421) should be the same.

Also, since the diffracted light focused by the second DOE is transmitted to the third DOE at the same angle, the width $Df_1$ of the diffracted light according to Equation 3, the size of the filter module (spatial filter 422 and second DOE 421), and the size of the third DOE 430 should be the same.

In the hologram displaying device of a large area according to an exemplary embodiment of the present invention, the optical path of the light source for displaying the hologram can be drastically reduced while effectively performing spatial filtering.

In addition, according to an exemplary embodiment of the present invention, in parallel noise filtering through spatial division is possible.

According to an exemplary embodiment of the present invention, compared to the conventional art filtering method, the optical demand performance is lowered, the optical path of the optical signal in the hologram displaying device is drastically reduced, the display form factor is improved, the manufacturing cost for the hologram displaying apparatus is reduced, and the entire weight and optical aberration are reduced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A hologram displaying apparatus, comprising:
 a light source configured to emit input light;
 a spatial light modulator configured to modulate the input light into diffracted light and including a plurality of pixel blocks; and
 a plurality of noise filtering elements configured to remove optical noise components from the diffracted light modulated by the spatial light modulator, and display a hologram,
 wherein each of the plurality of noise filtering elements corresponds to one of the plurality of pixel blocks, and comprises:
 a first lens corresponding to a pixel block and focusing the light diffracted by the pixel block;
 a spatial filter for removing an optical noise component from the focused diffracted light; and
 a second lens for transmitting noise filtered diffracted light of the focused diffracted light,
 wherein both of the spatial filter and the second lens are disposed on a back focal plane of the first lens.

2. The apparatus of claim 1, wherein the first lens is in contact with the pixel block and each of the plurality of noise filtering elements further includes:
 a third lens disposed in parallel corresponding to the spatial filter, and displaying the hologram using the noise filtered diffracted light.

3. The apparatus of claim 2, wherein each of the first lens, the second lens, and the third lens includes a diffractive optical element or a refractive optical element.

4. The apparatus of claim 3, wherein the first lens includes a first hologram optical element, and blocks part of waves of the light diffracted by the pixel block in a specific direction.

5. The apparatus of claim 4, wherein the second lens includes a second hologram optical element, and blocks part of waves of the light diffracted by the pixel block in a specific direction.

6. The apparatus of claim 5, wherein
 the first hologram optical element is configured to block higher-order diffraction components beyond the second order diffraction component diffracted in a first direction of the light diffracted by the pixel block, and
 the second hologram optical element is configured to block higher-order diffraction components beyond the second order diffraction component focused in a second direction of the focused diffracted light.

7. The apparatus of claim 6, wherein each of the first hologram optical element and the second hologram optical element is composed of a volume diffractive optical element.

8. The apparatus of claim 3, wherein
the first lens and the third lens have a first focal length, and
a sum of a size of the second lens and a size of the spatial filter is equal to a size of the pixel block.

9. The apparatus of claim 8, wherein a width of the light diffracted from each pixel block is twice a second focal length of the second lens.

10. The apparatus of claim 9, further comprising:
an upper partition wall for blocking light diffracted from each pixel block into an upper region of the second lens, and
a lower partition wall for blocking light diffracted from each pixel block into a lower region of the spatial filter.

11. The apparatus of claim 2, wherein the spatial filter is a single sideband filter for blocking a direct current (DC) component of the focused diffracted light and a conjugated component of the focused diffracted light from which the DC component is removed.

12. A hologram displaying apparatus, comprising a spatial light modulator, a first lens module, a second lens module, and a third lens module, wherein
the first lens module to the third lens module are convex lens modules,
the first lens module is located in contact with an input image plane of the spatial light modulator and applies focusing power on the light wave modulated in the spatial light modulator to prevent the modulated light wave from diverging,
the second lens module is located on a rear focal plane of the first lens module and projects the light wave to an area where the third lens module is located,
the third lens module converges the light wave that passes through the second lens module to display the input image plane in a space adjacent to the third lens module, and
a focal power of the second lens module is the same as a sum of a focal power of the first lens module and a focal power of the third lens module.

13. The apparatus of claim 12, wherein
the first lens module is placed in contact with the spatial light modulator, and
further comprises a spatial filter disposed in parallel with the second lens module, and spatially blocks optical noise including a DC component, a conjugate component, or a high-order component of the modulated light wave,
a sum of a size of the second lens module and a size of the spatial filter is the same as a size of the first lens module, and
the third lens module converges a signal of the modulated light wave where the optical noise is removed.

14. The apparatus of claim 13, wherein
an entire region of the spatial light modulator includes a plurality of pixel blocks including a plurality of pixels,
the first lens module is disposed in parallel corresponding to each of the pixel blocks and includes a plurality of first lenses for applying focusing power to the light waves modulated in each of the pixel blocks,
the second lens module is disposed in parallel corresponding to each of the pixel blocks and includes a plurality of second lenses for projecting the light waves modulated in each of the pixel blocks to an area where the third lens module is located, and
the third lens module is disposed in parallel corresponding to each of the pixel blocks and includes a plurality of third lenses for converging the light waves transmitted by each of the second lenses.

15. The apparatus of claim 14, wherein
a size of each of the first lenses, a size of each of the second lenses, and a size of each of the third lenses is equal to the size of each of the pixel blocks, and
a focal length of each of the first lenses is equal to a focal length of each of the third lenses.

16. The apparatus of claim 15, wherein
each of the first lenses consists of a DOE (diffractive optical element) including a holographic optical element (HOE), and
each of the first lenses includes the DOE or HOE of a volume-type diffractive optical element structure and reduces intensity of light waves of a higher-order term propagated to a region where other adjacent pixel blocks and other first lenses corresponding to the other adjacent pixel blocks are located.

17. The apparatus of claim 16, wherein each of the second lenses includes a DOE (diffractive optical element) including a holographic optical element (HOE), and blocks a direct current (DC) component, a phase-conjugate component of a predetermined hologram signal, and a high-order component among the modulated light waves using an angular selective characteristic of the HOE.

18. The apparatus of claim 17, further comprising a plurality of partition walls for blocking propagation of the modulated light waves in one pixel block of the spatial light modulator to an area where other adjacent pixel blocks and a first lens to a third lens corresponding to the other adjacent pixel blocks is located.

19. The apparatus of claim 18, wherein
the spatial filter includes a single sideband filter, and
the single sideband filter removes optical noise by phase-shifting for the light waves modulated by the spatial light modulator.

20. A hologram displaying apparatus, comprising:
a light source configured to emit light;
a spatial light modulator including a plurality of pixels configured to diffract the emitted light;
a first lens in contact with a pixel block including some pixels of the plurality of pixels of the spatial light modulator and configured to focus the light diffracted by the pixel block;
a second lens configured to transmit remaining diffracted light of the focused diffracted light except a noise component;
a spatial filter disposed in parallel with the second lens and configured to block the noise component of the focused diffracted light; and
a third lens configured to display a hologram by focusing light waves of which the noise component is removed,
wherein both of the second lens and the spatial filter are disposed on a back focal plane of the first lens.

* * * * *